US012335264B2

(12) United States Patent
Wang et al.

(10) Patent No.: US 12,335,264 B2
(45) Date of Patent: Jun. 17, 2025

(54) PREVENTING MASQUERADING SERVICE ATTACKS

(71) Applicant: International Business Machines Corporation, Armonk, NY (US)

(72) Inventors: Sen Wang, Beijing (CN); Mei Liu, Beijing (CN); Si Bo Niu, Beijing (CN); Wen Yi Gao, Beijing (CN); Zong Xiong ZX Wang, Beijing (CN); Guoxiang Zhang, Beijing (CN); Xiao Yi Tian, Beijing (CN); Xian Wei Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/441,288

(22) Filed: Feb. 14, 2024

(65) Prior Publication Data
US 2024/0187410 A1 Jun. 6, 2024

Related U.S. Application Data

(62) Division of application No. 17/411,226, filed on Aug. 25, 2021, now Pat. No. 11,943,221.

(51) Int. Cl.
*H04L 29/06* (2006.01)
*H04L 9/32* (2006.01)
*H04L 9/40* (2022.01)

(52) U.S. Cl.
CPC ........ *H04L 63/0884* (2013.01); *H04L 9/3247* (2013.01); *H04L 63/123* (2013.01); *H04L 63/1483* (2013.01)

(58) Field of Classification Search
CPC . H04L 63/0884; H04L 9/3247; H04L 63/123; H04L 63/1483; H04L 63/08;
(Continued)

(56) References Cited

U.S. PATENT DOCUMENTS 7,697,920 B1 4/2010 McClain
9,503,452 B1 11/2016 Kumar et al.
(Continued)

OTHER PUBLICATIONS

List of IBM Patents or Patent Applications Treated as Related; Appendix P; Date Filed: Feb. 14, 2024; 2 pages.
(Continued)

*Primary Examiner* — Malcolm Cribbs
(74) *Attorney, Agent, or Firm* — CANTOR COLBURN LLP; Teddi Maranzano

(57) ABSTRACT

Aspects of the invention include systems and methods configured to prevent masquerading service attacks. A non-limiting example computer-implemented method includes sending, from a first server in a cloud environment, a communication request comprising an application programming interface (API) key and a first server identifier to an identity and access management (IAM) server of the cloud environment. The API key can be uniquely assigned by the IAM server to a first component of the first server. The first server receives a credential that includes a token for the first component and sends the credential to a second server. The second server sends the credential, a second server identifier, and an identifier for a second component of the second server to the IAM server. The second server receives an acknowledgment from the IAM server and sends the acknowledgment to the first server.

12 Claims, 11 Drawing Sheets

(58) Field of Classification Search
CPC ............. H04L 63/0876; H04L 63/0892; H04L 63/061; H04L 63/065
See application file for complete search history.

(56) References Cited

U.S. PATENT DOCUMENTS

| | | |
|---|---|---|
| 9,769,153 B1 | 9/2017 | Bowen |
| 9,769,167 B2 | 9/2017 | Mary et al. |
| 2017/0070504 A1* | 3/2017 | Ramachandran ..... H04L 63/061 |
| 2017/0149790 A1 | 5/2017 | Yamamoto et al. |
| 2017/0329957 A1 | 11/2017 | Vepa et al. |
| 2018/0270219 A1 | 9/2018 | Li |
| 2020/0007530 A1 | 1/2020 | Mohamad Abdul et al. |
| 2020/0145459 A1* | 5/2020 | Feutz .................... H04L 63/062 |
| 2020/0322324 A1 | 10/2020 | Chang et al. |
| 2020/0403808 A1 | 12/2020 | Smith et al. |
| 2021/0152420 A1* | 5/2021 | Sidhartha ................ H04L 63/08 |
| 2021/0218773 A1 | 7/2021 | Prakash et al. |
| 2021/0281555 A1 | 9/2021 | He et al. |
| 2022/0150066 A1* | 5/2022 | Sugarev ................ H04L 9/3247 |
| 2022/0343302 A1* | 10/2022 | Singhal .............. G06Q 20/3674 |
| 2023/0069596 A1 | 3/2023 | Wang et al. |

OTHER PUBLICATIONS

P. Oberoi et al., "ARCN: Authenticated Routing on Cloud Network to Mitigate Insider Attacks on Infrastructure as a Service." Journal of Computational and Theoretical Nanoscience vol. 16. 2019. 11 Pages.

S. Ramteke et al., "Intrusion Detection of Masquerading Attacks & Secure Authentication in Cloud." IOSR Journal of Computer Engineering vol. 9, Issue 2. Feb. 2013. 4 Pages.

* cited by examiner

PREVENTING MASQUERADING SERVICE ATTACKS

BACKGROUND

The present invention generally relates to cloud computing and service, and more specifically, to computer systems, computer-implemented methods, and computer program products that prevent actors from masquerading service to attack other cloud services based on machine authentication and authorization.

Cloud computing has become a popular way to offer various Information Technology (IT) concepts as services. In one implementation, a user or client can request a service they desire and transact with a remote "cloud" provider for the needed service. Cloud services include providing access to remote resources, such as cloud storage, software, and remote hardware, so that tasks can be performed remotely on behalf of the client. Cloud services have become popular, in part, because they enable users to access resources without having to store or manage support for those resources locally. Thus, users can access more resources than they could if limited to a local machine. Cloud services span a range of applications and include, for example, cloud computing and remote storage.

Provisioning generally relates to configuring, managing, and providing computing resources and/or computing services. In the context of a cloud service, provisioning includes configuring and managing the remote computing resources and/or services that are allocated to the client. Software resources and services are provisioned to users by providing the users with access to instantiations (i.e., instances) of the remote software and hardware resources and services, usually after an authentication process.

SUMMARY

Embodiments of the present invention are directed to prevent masquerading service attacks. A non-limiting example method includes receiving, at a server in a cloud environment, a cloud admin application programming interface (API) key and a service policy from a cloud administrator of the cloud environment. The server sends server data including the cloud admin API key, the service policy, and a server identifier to an identity and access management (IAM) server of the cloud environment. The server receives a registration acknowledgment from the IAM server and sends the registration acknowledgment to the cloud administrator.

Embodiments of the present invention are directed to prevent masquerading service attacks. A non-limiting example method includes receiving, at a server in a cloud environment, a request for component deployment from an administrator of the cloud environment. The request can include an identifier for a component within the server. The server sends server data including the request for component deployment and a server identifier to an IAM server of the cloud environment. The server receives an acknowledgment from the IAM server that includes a component API key. The server sends the acknowledgment to the administrator after removing the API key.

Embodiments of the present invention are directed to prevent masquerading service attacks. A non-limiting example method includes sending, from a first server in a cloud environment, a communication request comprising an application programming interface (API) key and a first server identifier to an identity and access management (IAM) server of the cloud environment. The API key can be uniquely assigned by the IAM server to a first component of the first server. The first server receives a credential that includes a token for the first component and sends the credential to a second server. The second server sends the credential, a second server identifier, and an identifier for a second component of the second server to the IAM server. The second server receives an acknowledgment from the IAM server and sends the acknowledgment to the first server.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Security and authentication form a critical part of cloud servicing due to the remote, distributed nature of cloud resources. For example, it is not uncommon for a variety of unrelated clients to access, transact with, and otherwise use the same remote cloud service. Ensuring that each client's own use and data is protected from third party actors, including other clients, is very important, especially when the data being accessed or stored remotely is personal, sensitive, or proprietary.

Nowadays, more and more cloud services run as separate components in a shared cloud environment, complicating matters further, as access to and between each component may need to be separately authenticated on a per client basis. Component authentication can be handled in a variety of ways. In some implementations, credentials like username and password pairs, application programming interface (API) keys, certificates, etc., are used for authentication between components. These credentials are usually managed by an Identity and Access Management (IAM) server within or communicatively coupled to the cloud environment. However, these credentials are usually known and configured by a components administrator, such as, for example, a site reliability engineer (SRE).

Unfortunately, these types of approaches are inherently susceptible to a risk that an actor (e.g., an SRE) could exploit a known credential for a component to masquerade as that component in the cloud environment. For example, the actor can provide the credential for a first component to the IAM server to receive an authentication token for the first component. This token can then be provided as part of a request to other components in the cloud environment, which would see the request as a valid request coming from another component (i.e., the first component) in the cloud environment. This type of attack can allow the actor to effectively bypass the authentication scheme for the other components in the cloud environment. For clarity, an example of this type of masquerading attack is illustrated in FIG. 1.

Figure 1:
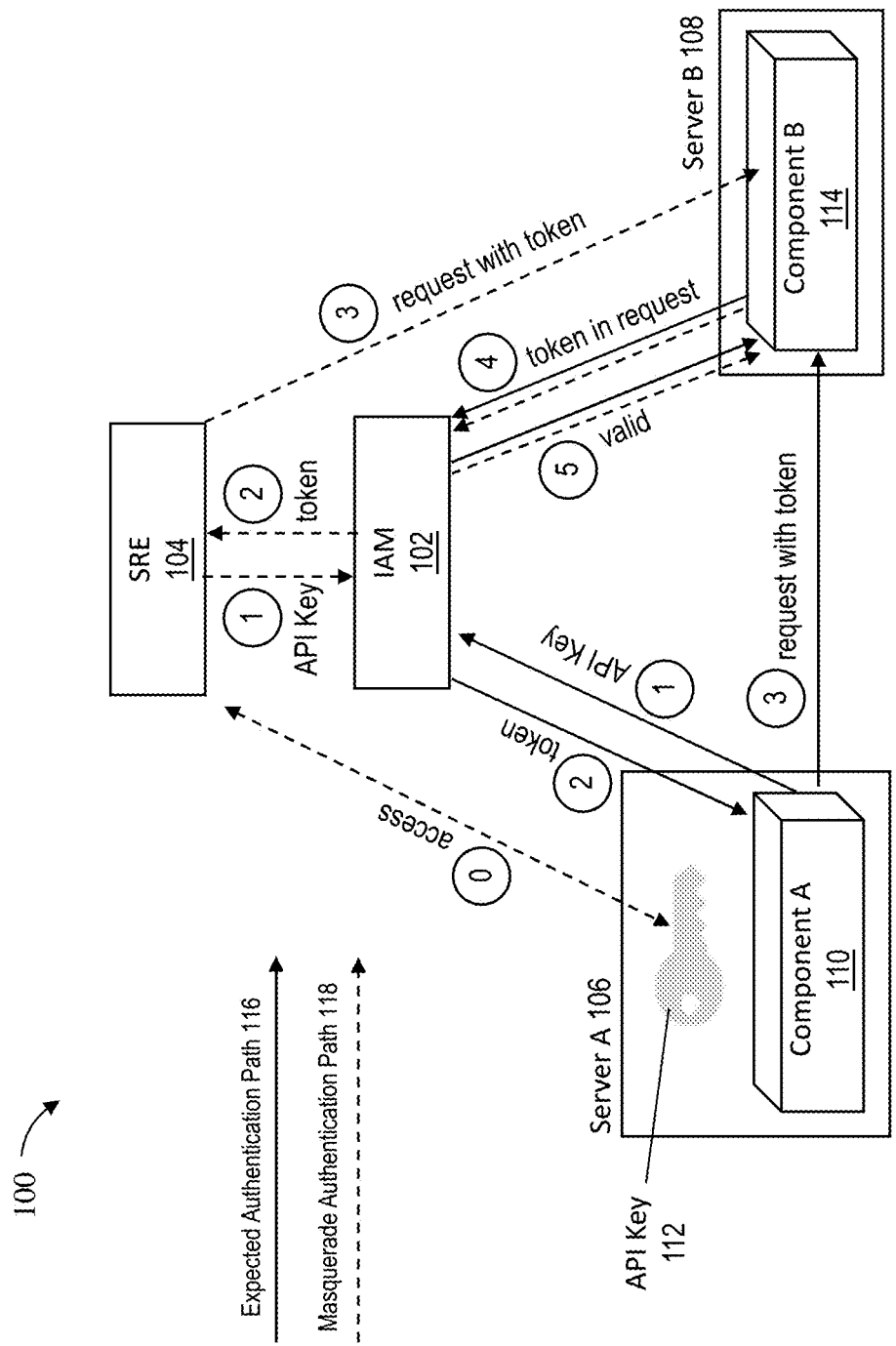
FIG. 1 illustrates an example masquerading attack in accordance with one or more embodiments of the present invention.

As shown in FIG. 1, a cloud environment 100 can include an IAM server 102 communicatively coupled to an SRE 104, a first server (e.g., Server A 106), and a second server (e.g., Server B 108). In some embodiments of the invention, Server A 106 can include one or more components (e.g., Component A 110) and an API key 112. In some embodiments of the invention, server B 108 can include one or more other components (e.g., Component B 114).

To ensure privacy and security, the various servers and components of the cloud environment 100 are protected via a security scheme whereby a request for access to a component in the cloud environment must be validated by the IAM 102. The expected authentication path 116 illustrates an example validation path for providing Component A 110 in Server A 106 access to the Component B 114 in Server B 108. It should be understood that while the expected authentication path 116 illustrates one example validation path (i.e., Component A 110 requests access to Component B 114), others are possible (e.g., Component B 114 requests access to Component A 110, either of Components 110, 116 requests access to one or more additional components, etc.).

To initiate the request, Component A 110 provides a credential (e.g., the stored API key 112) for Server A 106 to the IAM 102 (step 1 in the expected authentication path 116). The IAM 102 authenticates the API key 112 and, if valid, provides a token to the Component A 110 (step 2 in the expected authentication path 116). Component A 110 can then provide this token to Component B 114 along with a request for access (step 3 in the expected authentication path 116). Component B 114 forwards the request for access, including the token, to the IAM 102 (step 4 in the expected authentication path 116). Finally, the IAM 102 authenticates the token by ensuring that the token matches the original token in step 2. Once authenticated, the IAM 102 provides an acknowledgment to Component B 114 indicating that the request for access from Component A 110 is valid (step 5 in the expected authentication path 116). Access to Component B 114 is then provided to Component A 110 (not separately shown).

Unfortunately, the SRE 104 can leverage its administrative access to the API key 112 in Server A 106 to masquerade as the Component A 110 within the cloud environment 100. An example of this type of attack vector is shown as the masquerade authentication path 118. During this attack vector the SRE 104 will directly access the API key 112 (step 0 in the masquerade authentication path 118). The SRE 104 will then provide the API key 112 to the IAM 102 (step 1 in the masquerade authentication path 118). The IAM 102 authenticates the API key 112 and, if valid, provides a token to the SRE 104 (step 2 in the masquerade authentication path 118). The SRE 104 can then provide this token to Component B 114 along with a request for access (step 3 in the masquerade authentication path 118). Component B 114 forwards the request for access, including the token, to the IAM 102 (step 4 in the masquerade authentication path 118). Finally, the IAM 102 authenticates the token by ensuring that the token matches the original token in step 2. Once authenticated, the IAM 102 provides an acknowledgment to Component B 114 indicating that the request for access is valid (step 5 in the masquerade authentication path 118). Access to Component B 114 is then provided to SRE 104 (not separately shown).

One or more embodiments of the present invention address one or more of the above-described shortcomings by providing computer-implemented methods, computing systems, and computer program products that prevent masquerading service attacks. Embodiments of the present invention provide a mechanism to issue credentials directly to components within servers in the data center or cloud environment instead of issuing those credentials to the data center or cloud administrators (e.g., system admins, SREs, etc., who have physical access to the cloud data centers and/or are responsible for cloud service deployment). Under this mechanism servers are registered with the IAM and components are deployed on the registered servers prior to allowing access (communication) between components in the cloud environment.

In some embodiments of the invention, the component credential is generated internally by an IAM server and issued directly to the component within the cloud environment. In some embodiments of the invention, the component is run within a lock-down operating system of its respective server. As used herein, a "lock-down" system refers to a system which can only be accessed using a limited API, ensuring that nobody (e.g., third parties, admins, SREs, etc.) can know or access the credential (excepting, of course, the IAM server and the respective component server itself). In some embodiments of the invention, all credential requests to the IAM server must be signed by a private key stored on the component's server. This approach ensures that all requests are made from "trusted" servers. As used herein, a "trusted" server from the point of view of the IAM server refers to a server whose requests are signed using a private key known only to that server.

Advantageously, a credentialing deployment system configured according to one or more embodiments offers several technical solutions over conventional cloud-based credentialing approaches. As an initial matter, separating the data center or cloud administrators from the component credentialing process greatly reduces the risk of being masqueraded by eliminating the previously mentioned attack vector. Requests to IAM server can be signed using a server's private key to ensure that all the requests originate from trusted servers. Notably, the IAM server will only issue a credential to components running on a trusted server. The credential (e.g., an API key) can then be stored within a lock-down operating system of the component's respective server. Consequently, nobody, including even the data center's own administrators (e.g., data center admins, system admins, SREs, etc.), can access the credential.

Figure 2:
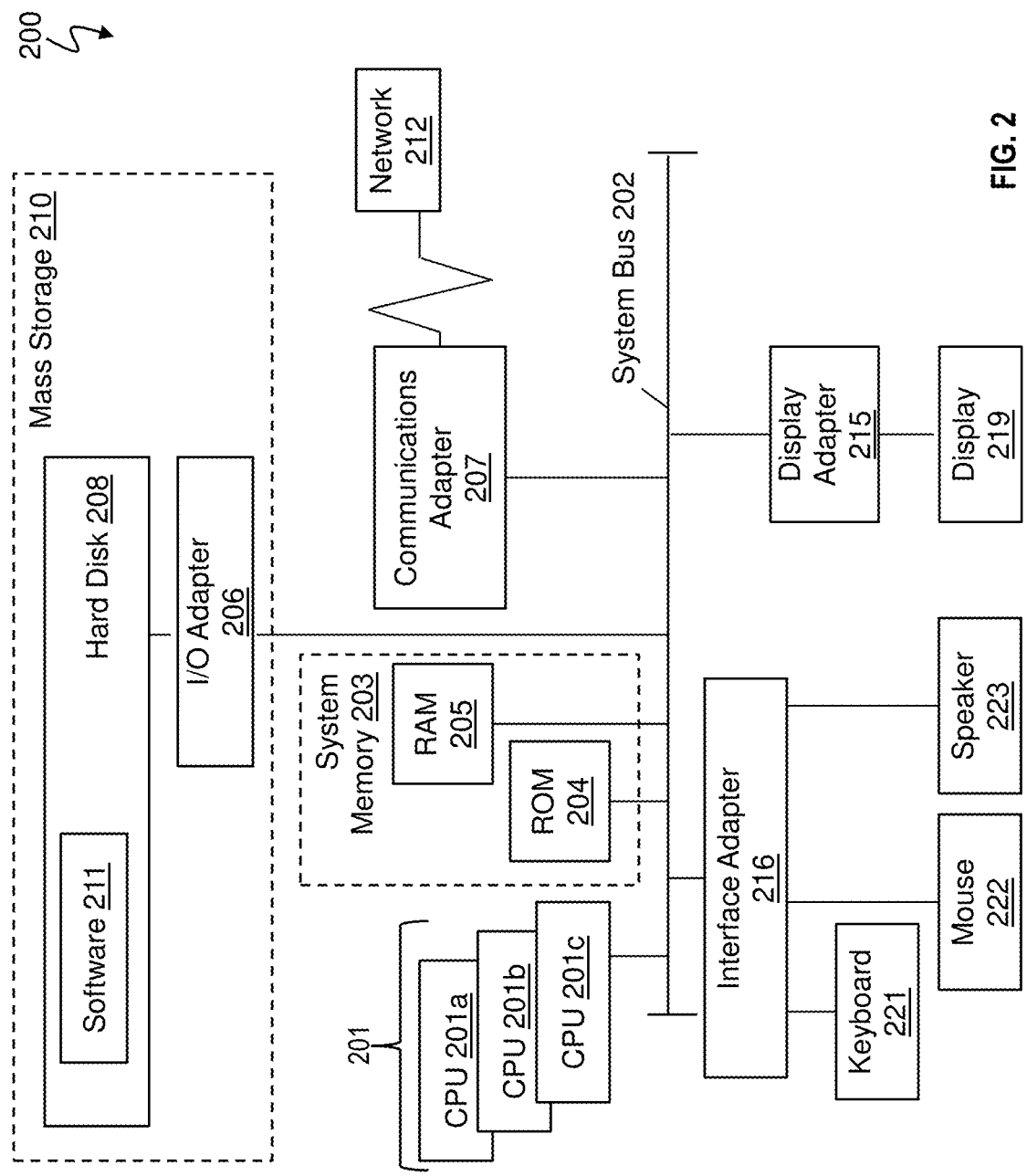
FIG. 2 depicts a block diagram of an example computer system for use in conjunction with one or more embodiments of the present invention.

Turning now to FIG. 2, a computer system 200 is generally shown in accordance with one or more embodiments of the invention. The computer system 200 can be an electronic, computer framework comprising and/or employing any number and combination of computing devices and networks utilizing various communication technologies, as described herein. The computer system 200 can be scalable, extensible, and modular, with the ability to change to different services or reconfigure some features independently of others. The computer system 200 may be, for example, a server, desktop computer, laptop computer, tablet computer, or smartphone. In some examples, computer system 200 may be a cloud computing node (e.g., a node 10 of FIG. 10 below). Computer system 200 may be described in the general context of computer system executable instructions, such as program modules, being executed by a computer system. Generally, program modules may include routines, programs, objects, components, logic, data structures, and so on that perform particular tasks or implement particular abstract data types. Computer system 200 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, the computer system 200 has one or more central processing units (CPU(s)) 201a, 201b, 201c, etc., (collectively or generically referred to as processor(s) 201). The processors 201 can be a single-core processor, multi-core processor, computing cluster, or any number of other configurations. The processors 201, also referred to as processing circuits, are coupled via a system bus 202 to a system memory 201 and various other components. The system memory 201 can include a read only memory (ROM) 204 and a random access memory (RAM) 205. The ROM 204 is coupled to the system bus 202 and may include a basic input/output system (BIOS) or its successors like Unified Extensible Firmware Interface (UEFI), which controls certain basic functions of the computer system 200. The RAM is read-write memory coupled to the system bus 202 for use by the processors 201. The system memory 201 provides temporary memory space for operations of said instructions during operation. The system memory 201 can include random access memory (RAM), read only memory, flash memory, or any other suitable memory systems.

The computer system 200 comprises an input/output (I/O) adapter 206 and a communications adapter 207 coupled to the system bus 202. The I/O adapter 206 may be a small computer system interface (SCSI) adapter that communicates with a hard disk 208 and/or any other similar component. The I/O adapter 206 and the hard disk 208 are collectively referred to herein as a mass storage 210.

Software 211 for execution on the computer system 200 may be stored in the mass storage 210. The mass storage 210 is an example of a tangible storage medium readable by the processors 201, where the software 211 is stored as instructions for execution by the processors 201 to cause the computer system 200 to operate, such as is described herein below with respect to the various Figures. Examples of computer program product and the execution of such instruction is discussed herein in more detail. The communications adapter 207 interconnects the system bus 202 with a network 212, which may be an outside network, enabling the computer system 200 to communicate with other such systems. In one embodiment, a portion of the system memory 201 and the mass storage 210 collectively store an operating system, which may be any appropriate operating system to coordinate the functions of the various components shown in FIG. 2.

Additional input/output devices are shown as connected to the system bus 202 via a display adapter 215 and an interface adapter 216. In one embodiment, the adapters 206, 207, 215, and 216 may be connected to one or more I/O buses that are connected to the system bus 202 via an intermediate bus bridge (not shown). A display 219 (e.g., a screen or a display monitor) is connected to the system bus 202 by the display adapter 215, which may include a graphics controller to improve the performance of graphics intensive applications and a video controller. A keyboard 221, a mouse 222, a speaker 221, etc., can be interconnected to the system bus 202 via the interface adapter 216, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 2, the computer system 200 includes processing capability in the form of the processors 201, and, storage capability including the system memory 201 and the mass storage 210, input means such as the keyboard 221 and the mouse 222, and output capability including the speaker 221 and the display 219.

In some embodiments, the communications adapter 207 can transmit data using any suitable interface or protocol, such as the internet small computer system interface, among others. The network 212 may be a cellular network, a radio network, a wide area network (WAN), a local area network (LAN), or the Internet, among others. An external computing device may connect to the computer system 200 through the network 212. In some examples, an external computing device may be an external webserver or a cloud computing node.

It is to be understood that the block diagram of FIG. 2 is not intended to indicate that the computer system 200 is to include all of the components shown in FIG. 2. Rather, the computer system 200 can include any appropriate fewer or additional components not illustrated in FIG. 2 (e.g., additional memory components, embedded controllers, modules, additional network interfaces, etc.). Further, the embodiments described herein with respect to computer system 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
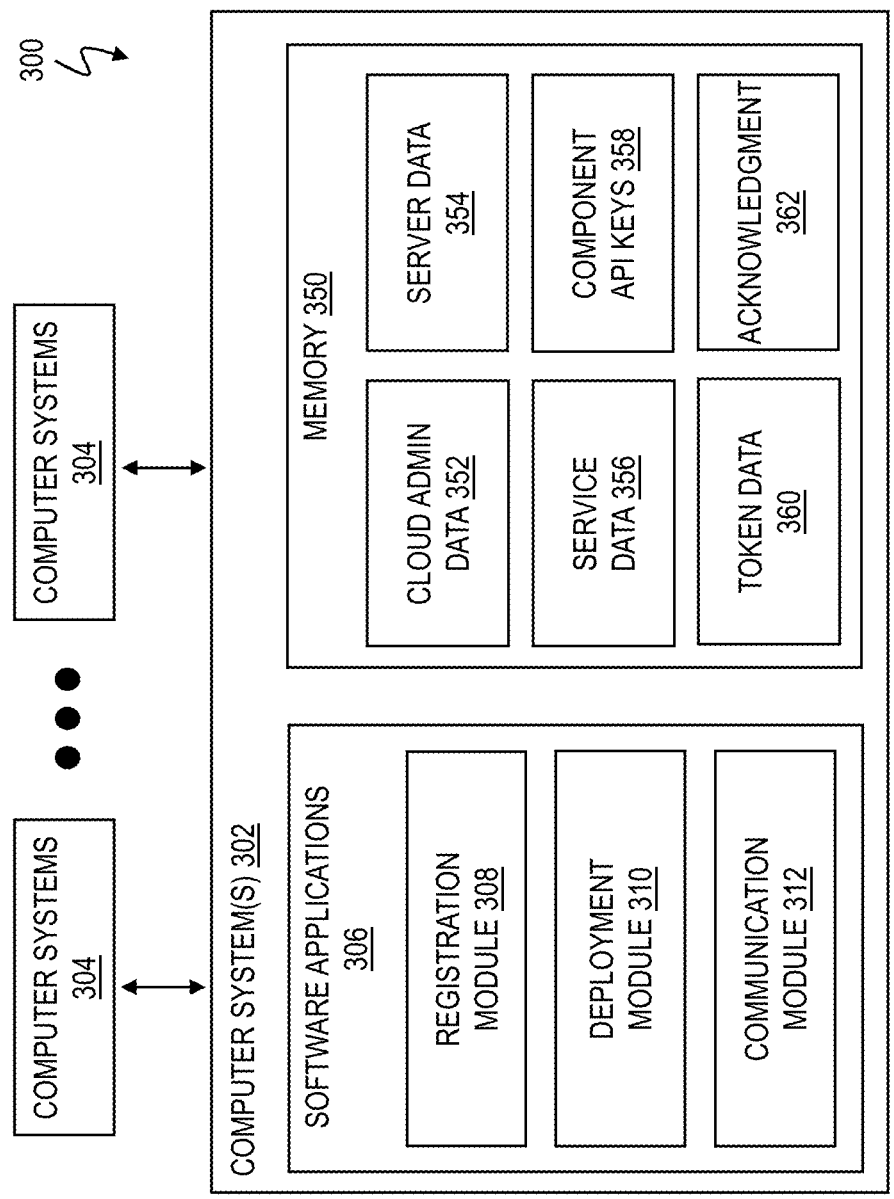
FIG. 3 is a block diagram of a system in accordance with one or more embodiments of the present invention.

FIG. 3 is a block diagram of a system 300 that prevent masquerading service attacks in accordance with one or more embodiments of the present invention. FIG. 3 depicts one or more computer systems 302 coupled to one or more computer systems 304 via a wired and/or wireless network. For example, computer system 302 can be representative of one or more cloud-based resources (e.g. remote computers, etc.), and computer systems 304 can be representative of numerous client (local) computers. One or more of the computer systems 302 can be configured to deploy a resource (software, hardware, etc.) for use by one or more computer systems 304. Elements of the computer system 200 of FIG. 2 may be used in and/or integrated into computer systems 302 and computer systems 304. In some embodiments of the invention, computation is done directly at the local level. In other words, elements of the computer system 302 can instead (or in addition) be elements of the computer systems 304.

The software applications 306 can include a registration module 308, a deployment module 310, and a communication module 312. The software applications 306 may utilize and/or be implemented as software 211 executed on one or more processors 201, as discussed in FIG. 2. Memory 350 of the computer systems 302 can store, for example, cloud admin data 352, server data 354, service data 356, component API keys 358, token data 360, and acknowledgment(s) 362. Block diagrams 400, 500, and 600 of FIGS. 4, 5, and 6, respectively, illustrates interactions between various components of the software applications 306 and memory 350 of FIG. 3 for preventing masquerading service attacks.

Figure 4:
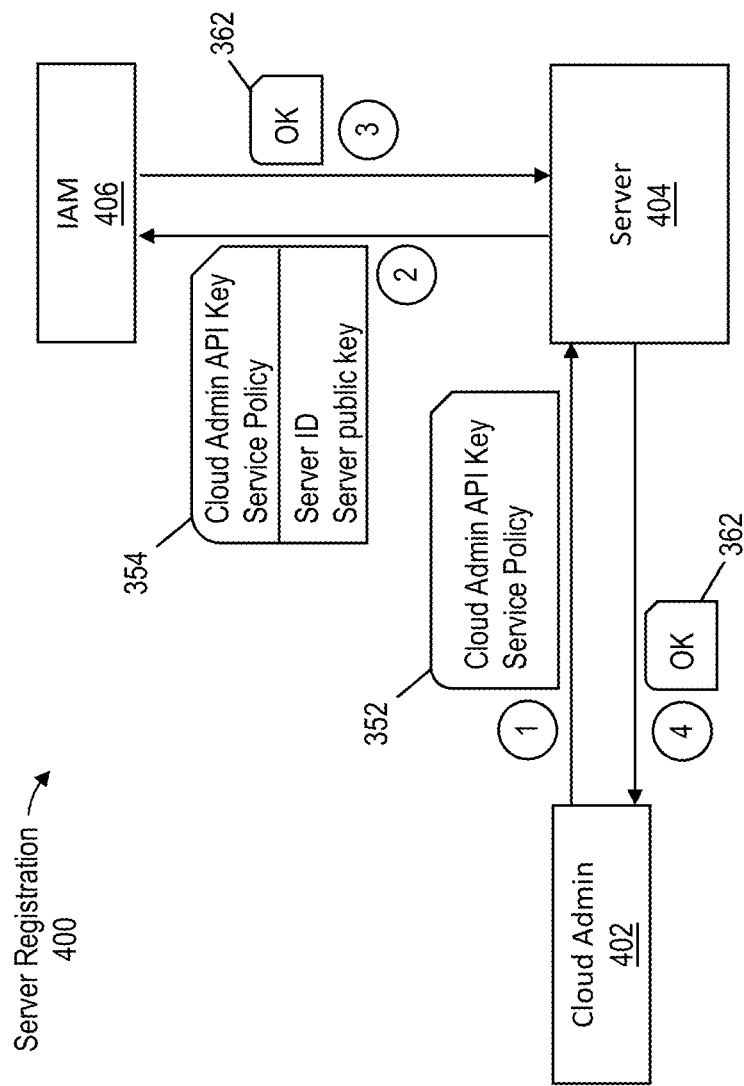
FIG. 4 is a block diagram of a dataflow for server registration in accordance with one or more embodiments of the present invention.

FIG. 4 illustrates a data flow for server registration 400 in accordance with one or more embodiments of the present invention. As shown in FIG. 4, server registration 400 can include a data flow between a cloud admin 402, a server 404, and an IAM server 406 (simply, "IAM 406"). In some embodiments of the invention, cloud admin 402 triggers the server registration 400 data flow by providing the cloud admin data 352 to the server 404. In some embodiments of the invention, the cloud admin data 352 includes a cloud admin API key and a service policy (also referred to as an authorization policy) for the respective server. The service policy defines the rules regarding which services can be accessed by other services. For example, the service policy can stipulate that a service A can only be accessed by service A and service B. In some embodiments of the invention, each component is assigned to a service. In this scenario the service policy actually defines which components can be accessed by other components.

The server 404 sends, responsive to receiving the cloud admin data 352, server data 354 to the IAM 406. In some embodiments of the invention, the server data 354 includes registration information for the server, such as, for example, the cloud admin data 352, a server ID, and the server's own public key. In some embodiments of the invention, the server 404 attaches the server data 354 to the cloud admin data 352.

In some embodiments of the invention, the IAM 406 attempts to verify the server data 354, and if successful, sends acknowledgement data (e.g., acknowledgement 362) as a response to the server 404. In some embodiments of the invention, proper verification of server registration 400 requires matching one or more components of the server data 354 (e.g., the cloud admin API key, the service policy, the server ID, the server public key, etc.) against preconfigured data stored in a database (not separately shown) within or accessible to the IAM 406. For example, the IAM 406 can maintain a database of known cloud admin API keys as well as a list of known server IDs for authenticating the cloud admin 402 and the server 404, respectively. In some embodiments of the invention, the IAM 406 includes one or more private keys which can be used to authenticate the cloud admin's API key and the server's public key. In some embodiments of the invention, failure to authenticate any portion of the server data 354 results in a denial of the registration process.

Once verified (i.e., once the server 404 receives the acknowledgement 362), the server 404 forwards or provides acknowledgement data (e.g., acknowledgement 362) to the cloud admin 402, completing the registration process. In some embodiments of the invention, the AIM 406 adds the verified server 404 to an internally maintained list of trusted servers.

Figure 5:
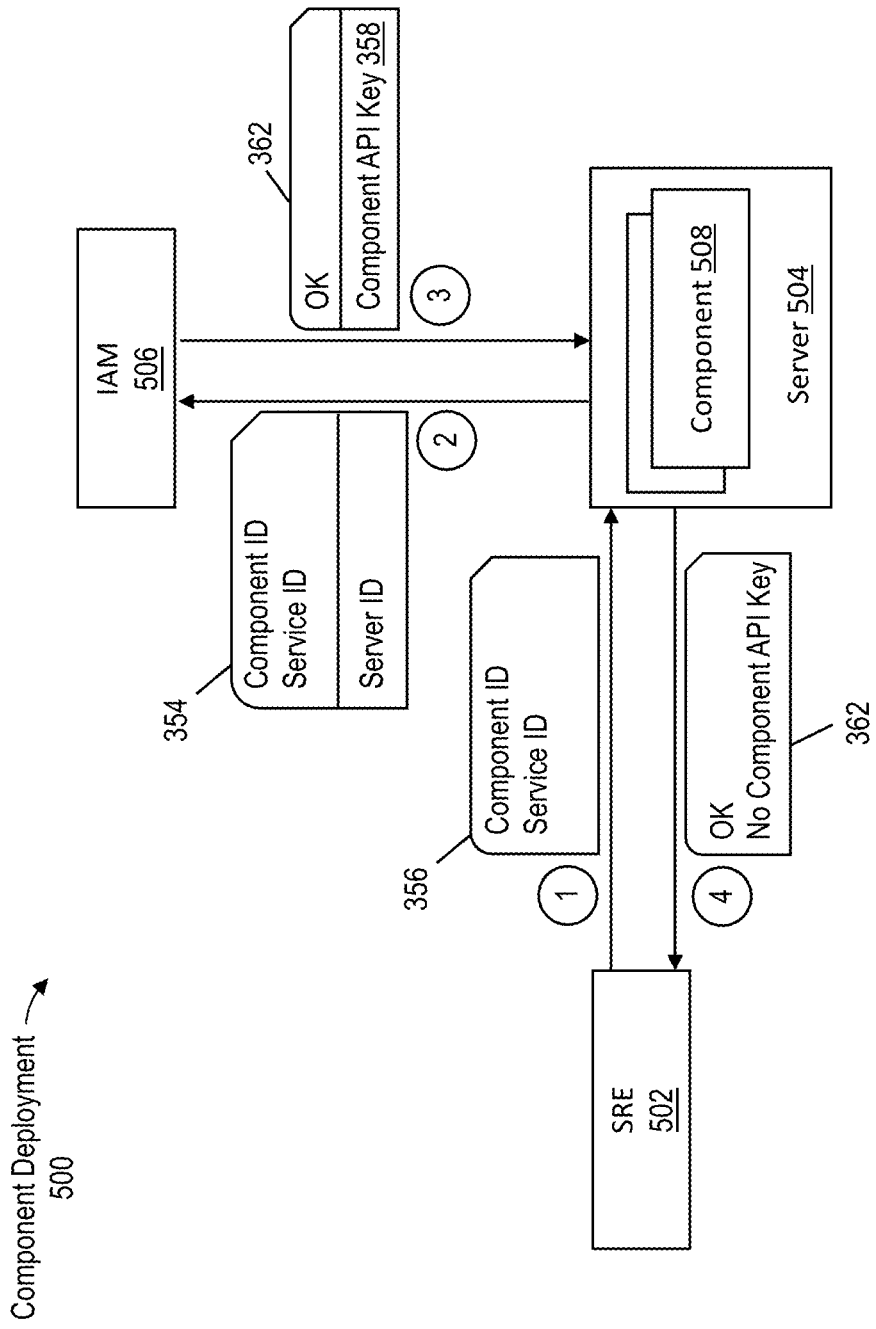
FIG. 5 is a block diagram of a dataflow for component deployment in accordance with one or more embodiments of the present invention.

FIG. 5 illustrates a data flow for component deployment 500 in accordance with one or more embodiments of the present invention. As shown in FIG. 5, component deployment 500 can include a data flow between an SRE 502, a server 504, and an IAM 506. To register a new component 508 with the IAM 506, the SRE 502 triggers the component deployment 500 data flow by providing the service data 356 to the server 504 (in this context, the service data 356 can also be referred to as component deployment request data). In some embodiments of the invention, the service data 356 includes a component ID and a service ID for the respective component. Here, the component ID identifies a component, and the service ID identifies the respective service.

The server 504 sends, responsive to receiving the service data 356, server data 354 to the IAM 506. In some embodiments of the invention, the server data 354 includes registration information for the component 508, such as, for example, the service data 356 and a server ID. In some embodiments of the invention, the server 504 attaches the server data 354 to the service data 356.

In some embodiments of the invention, the IAM 506 attempts to verify the server data 354, and if successful, sends acknowledgement data 362 that includes a component API key 358. In some embodiments of the invention, the IAM 506 internally generates the component API key 358. In some embodiments of the invention, the IAM 506 generates the component API key 358 in response to receiving the server data 354 (i.e., on-demand key generation). In some embodiments of the invention, the IAM 506 pre-generates a list of API keys and selects an unused key for use as the component API key 358.

In some embodiments of the invention, proper verification of the component deployment 500 data flow requires matching one or more components of the server data 354 (e.g., the component ID, the service ID, the server ID, etc.) against preconfigured data stored in a database (not separately shown) within or accessible to the IAM 506. For example, the IAM 506 can maintain a database of trusted servers (e.g., trusted server IDs) collected during the server registration 400 data flow discussed previously with respect to FIG. 4. In this manner, the IAM 506 can ensure that the component deployment 500 data flow only involves components within trusted servers. In some embodiments of the invention, failure to authenticate any portion of the server data 354 results in a denial of the component deployment process.

Once verified (i.e., once the server 504 receives the acknowledgement 362 and the component API key 358), the server 504 forwards or provides acknowledgement data (e.g., acknowledgement 362) to the SRE 502, completing the deployment process. Notably, the component API key 358 is removed from the acknowledgement 262 prior to transmitting the acknowledgement data to the SRE 502. In this manner, the SRE 502 is never provided direct access to the component API key 358.

In some embodiments of the invention, the server 504 and/or the component 508 is configured as a lock-down system (i.e., a lock-down server and/or a lock-down component, not separately shown). In some embodiments of the invention, the component API key 358 is stored within the lock-down system. In this manner, the SRE 502 cannot be retrieved by the SRE 502 (or anyone else, including the cloud admin 402).

For example, the server 504 can be running a secured, lock-down operating system having only a limited API. In some embodiments of the invention, the limited API does not include functionality for transmitting the component API key 358 in response to a request. Instead, the limited API includes functionality which only allows the respective server to provide the component API key 358 to the IAM 506. In some embodiments of the invention, the component API key 358 can only be provided when necessary for internal requirements (e.g., when a component on the trusted server needs access to another component in the cloud environment). Notably, the decision to supply the component API key 358 lies within the component and the respective server and no functionality is provided which would allow either to provide the component API key 358 to the SRE 502.

Figure 6:
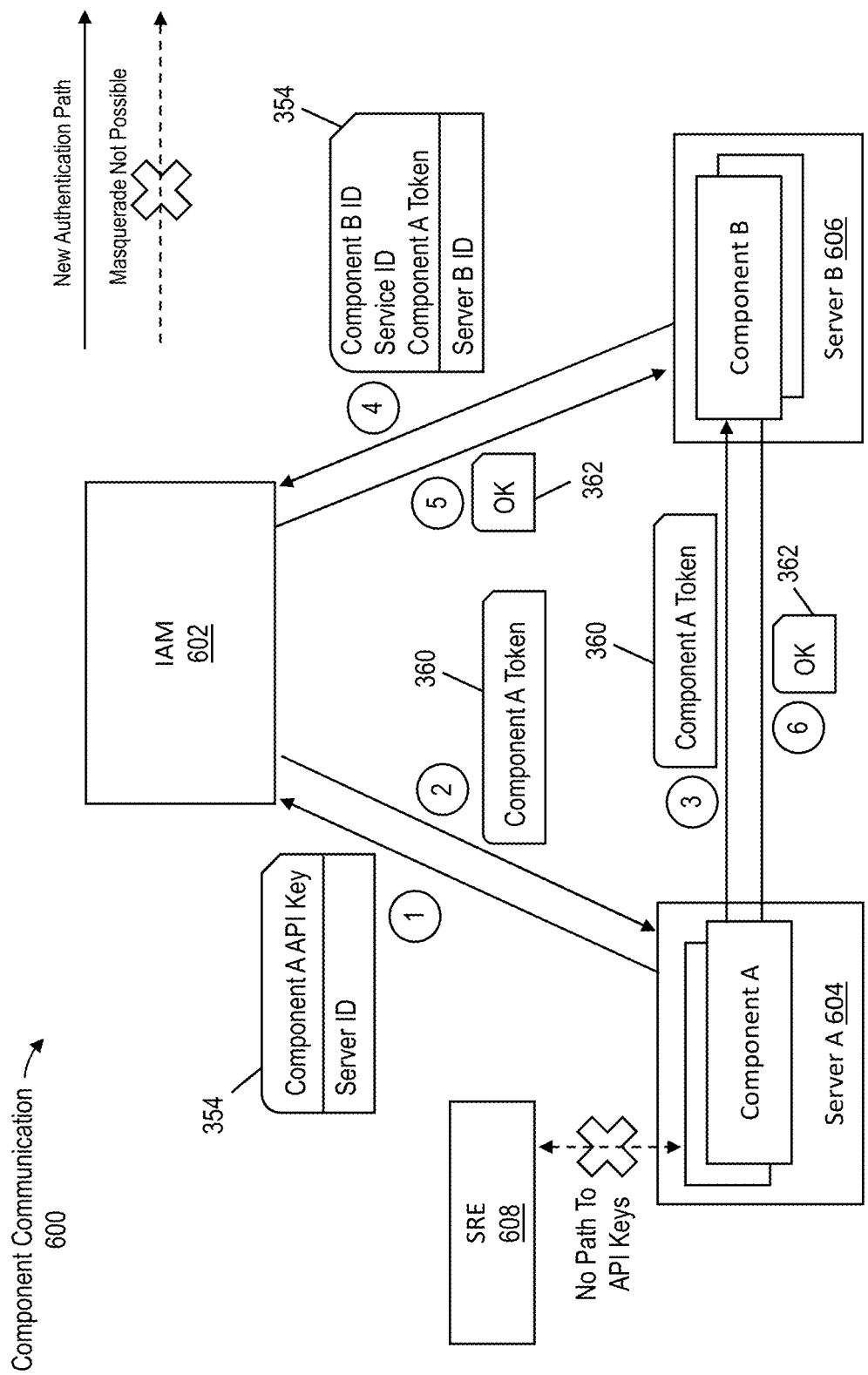
FIG. 6 is a block diagram of a dataflow for component communication in accordance with one or more embodiments of the present invention.

FIG. 6 illustrates a data flow for component communication 600 in accordance with one or more embodiments of the present invention. As shown in FIG. 6, component communication 600 can include a data flow between an IAM 602, a first server (e.g., Server A 604), and a second server (e.g., Server B 606). In some embodiments of the invention, the IAM 602, the IAM 506, and the IAM 406 are the same IAM server. Similarly, in some embodiments of the invention, the server A 604 and/or the server B 606 undergoes the same server registration and component deployment processes 400, 500 discussed previously with respect to either or both of server 504 (FIG. 5) and server 404 (FIG. 4). Notably, the component communication 600 data flow does not involve an SRE 608.

In some embodiments of the invention, a component in Server A 604 (here, "Component A") needs access to another component (here, "Component B") stored on Server B 606. To initiate a request to access Component B, the Server A 604 sends server data 354 to the IAM 602 (in this context, the server data 354 can also be referred to as a communication request). The server data 354 can include a component API key (here, "Component A API key") previously provided to the IAM 506 during the component deployment 500 (FIG. 5). In some embodiments of the invention, the server data 354 is signed by the server A 604 using, e.g., the same server ID provided to the IAM 506 during the component deployment 500 (FIG. 5).

In some embodiments of the invention, the IAM 602 attempts to verify the server data 354, and if successful, sends token data 360 (also referred to as a credential, or, in the illustrated example, "Component A token") to Server A 604. In some embodiments of the invention, the IAM 602 matches the Component A API key against the component API key previously provided during the component deployment 500 (FIG. 5). In this manner, the IAM 602 can ensure that the request originates from a properly deployed component. In some embodiments of the invention, the IAM 602 matches the Server ID against the Server ID previously provided during the server registration 400 (FIG. 4). In this manner, the IAM 602 can ensure that the request originates from a trusted server. In other words, the IAM 602 verifies both the component and the server during verification. In some embodiments of the invention, failure to authenticate any portion of the server data 354 results in a denial of the request.

Once verified (i.e., once the Server A 604 receives the component A token), server A 604 sends the token data 360 to Component B, either directly or through the Server B 606.

Component B packages the component A token with authenticating information, such as, for example, Component B ID, Service ID, and Server B ID, each generated according to one or more embodiments. The packaged information is then provided as server data 354 to the IAM 602. In some embodiments of the invention, the server data 354 is signed by the private key of the Server B 606.

In some embodiments of the invention, the IAM 602 attempts to verify the server data 354, and if successful, sends acknowledgement data (e.g., acknowledgement 362) as a response to server B 606. In some embodiments of the invention, proper verification of the server data 354 requires matching one or more components of the server data 354 (e.g., component B ID, service ID, component A token, server B ID, etc.) against data stored in a database (not separately shown) within or accessible to the IAM 602. As discussed previously, this data can be provided or generated during the prior server registration 404 and component deployment 500 data flows. In some embodiments of the invention, failure to authenticate any portion of the server data 354 results in a denial of the access request (i.e., the component-to-component communication request).

Once verified (i.e., once server B 606 receives the acknowledgement 362), server B 606 forwards or provides acknowledgement data (e.g., acknowledgement 362) to Server A 604, completing the communication process. In some embodiments of the invention, Component A and Component B begin communication (sharing data, etc.) following the receipt of the acknowledgement 362 by the Server A 604.

Figure 7:
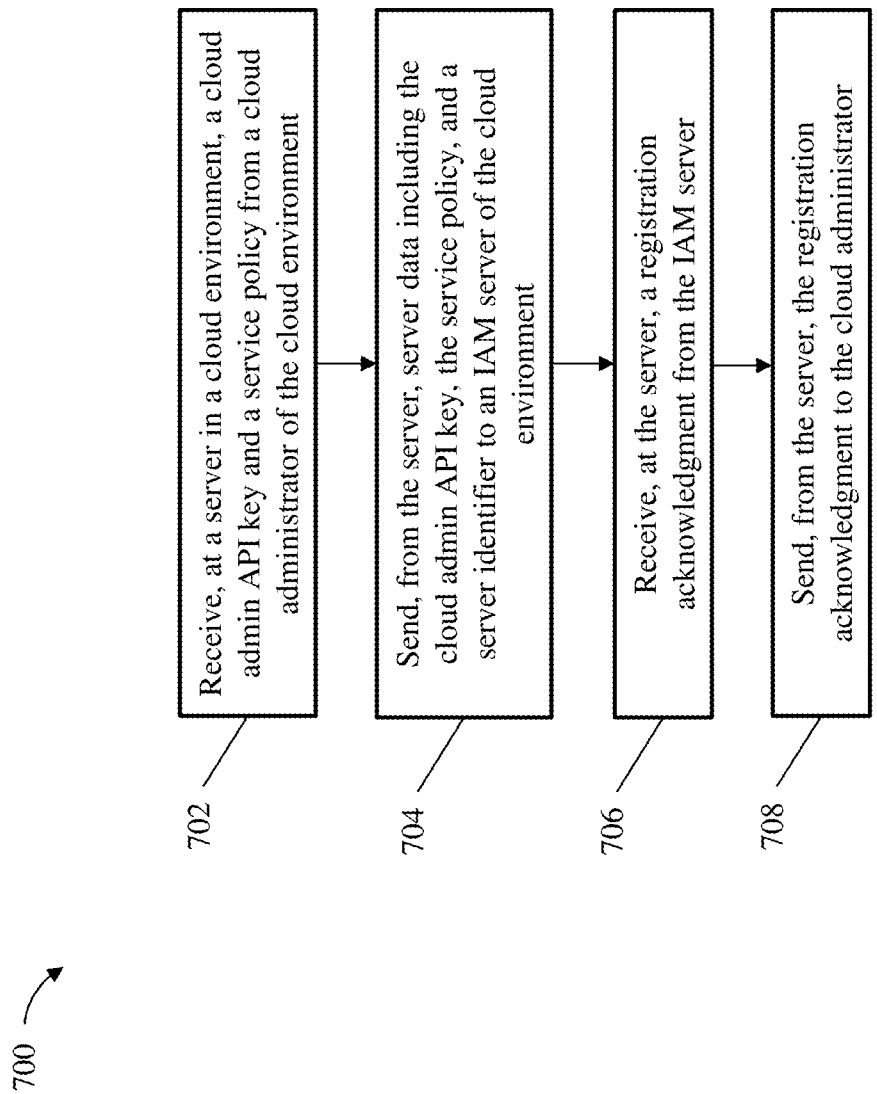
FIG. 7 is a flowchart in accordance with one or more embodiments of the present invention.

Referring now to FIG. 7, a flowchart 700 for preventing masquerading service attacks is generally shown according to an embodiment. The flowchart 700 is described in reference to FIGS. 1-6 and may include additional blocks not depicted in FIG. 7. Although depicted in a particular order, the blocks depicted in FIG. 7 can be rearranged, subdivided, and/or combined. At block 702, a server in a cloud environment receives a cloud admin API key and a service policy from a cloud administrator of the cloud environment.

At block 704, the server sends server data that includes the cloud admin API key, the service policy, and a server identifier to an IAM server of the cloud environment. In some embodiments of the invention, the server identifier includes identification data that is unique to the server in the cloud environment.

At block 706, the server receives a registration acknowledgment from the IAM server. In some embodiments of the invention, the registration acknowledgment indicates that the IAM server has verified the public key against a private key internal to the IAM server. In some embodiments of the invention, the registration acknowledgment indicates that the IAM server has added the server to an internally maintained list of trusted servers. At block 708, the server sends the registration acknowledgment to the cloud administrator.

The method can further include signing, by the server, the server data using a public key of the server. In some embodiments of the invention, the server signs the server data prior to sending the server data to the IAM server.

Figure 8:
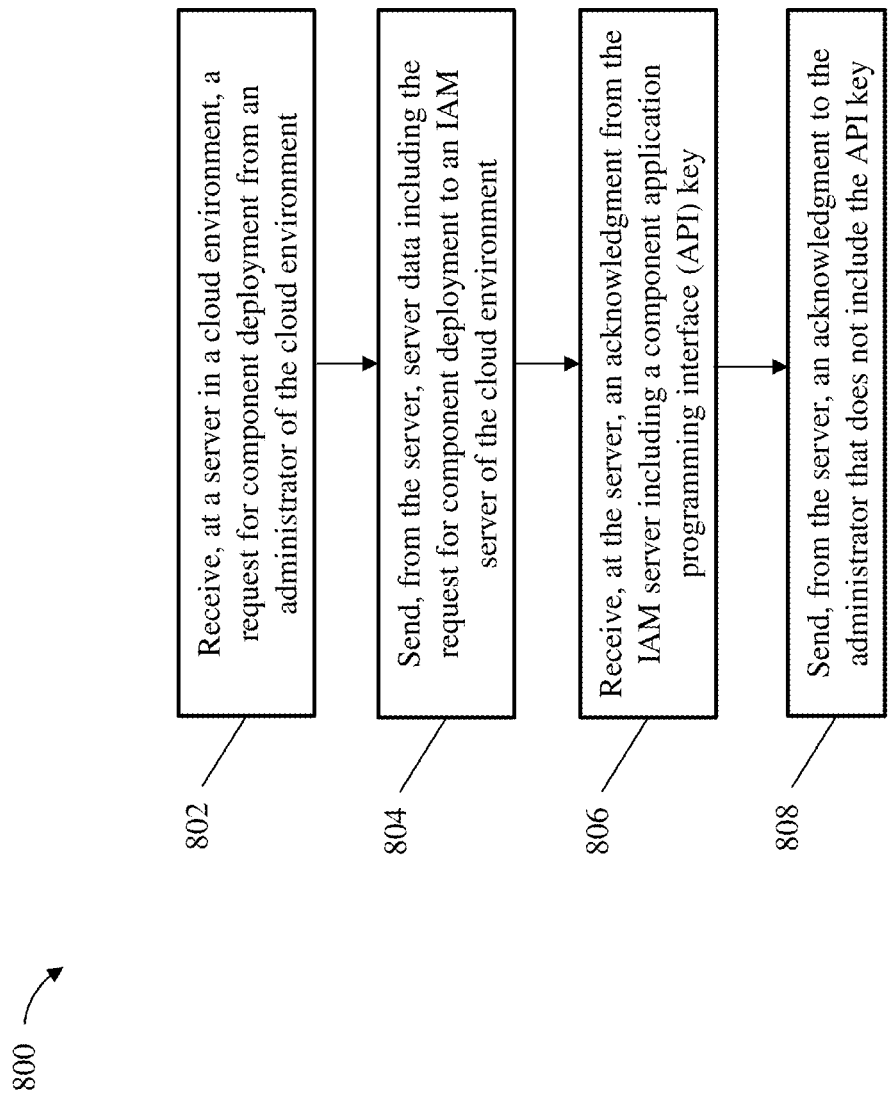
FIG. 8 is a flowchart in accordance with one or more embodiments of the present invention.

Referring now to FIG. 8, a flowchart 800 for preventing masquerading service attacks is generally shown according to an embodiment. The flowchart 800 is described in reference to FIGS. 1-6 and may include additional blocks not depicted in FIG. 8. Although depicted in a particular order, the blocks depicted in FIG. 8 can be rearranged, subdivided, and/or combined. At block 802, a server in a cloud environment receives a request for component deployment from an administrator of the cloud environment. In some embodiments of the invention, the request includes an identifier for a specific component within the server. In some embodiments of the invention, the administrator is a site reliability engineer (SRE) of the cloud environment.

At block 804, the server sends server data that includes the request for component deployment and a server identifier to an IAM server of the cloud environment. In some embodiments of the invention, the server identifier includes identification data that is unique to the server in the cloud environment.

At block 806, the server receives an acknowledgment from the IAM server that includes a component API key. In some embodiments of the invention, the acknowledgement from the IAM server indicates that the component has been deployed by the IAM server.

At block 808, the server sends an acknowledgment to the administrator that does not include the API key. In some embodiments of the invention, the server removes the API key from the acknowledgment from the IAM server. In some embodiments of the invention, the server generates a new acknowledgement that does not include the component API key.

The method can further include signing, by the server, the server data using a public key of the server. In some embodiments of the invention, the server signs the server data prior to sending the server data to the IAM server.

Figure 9:
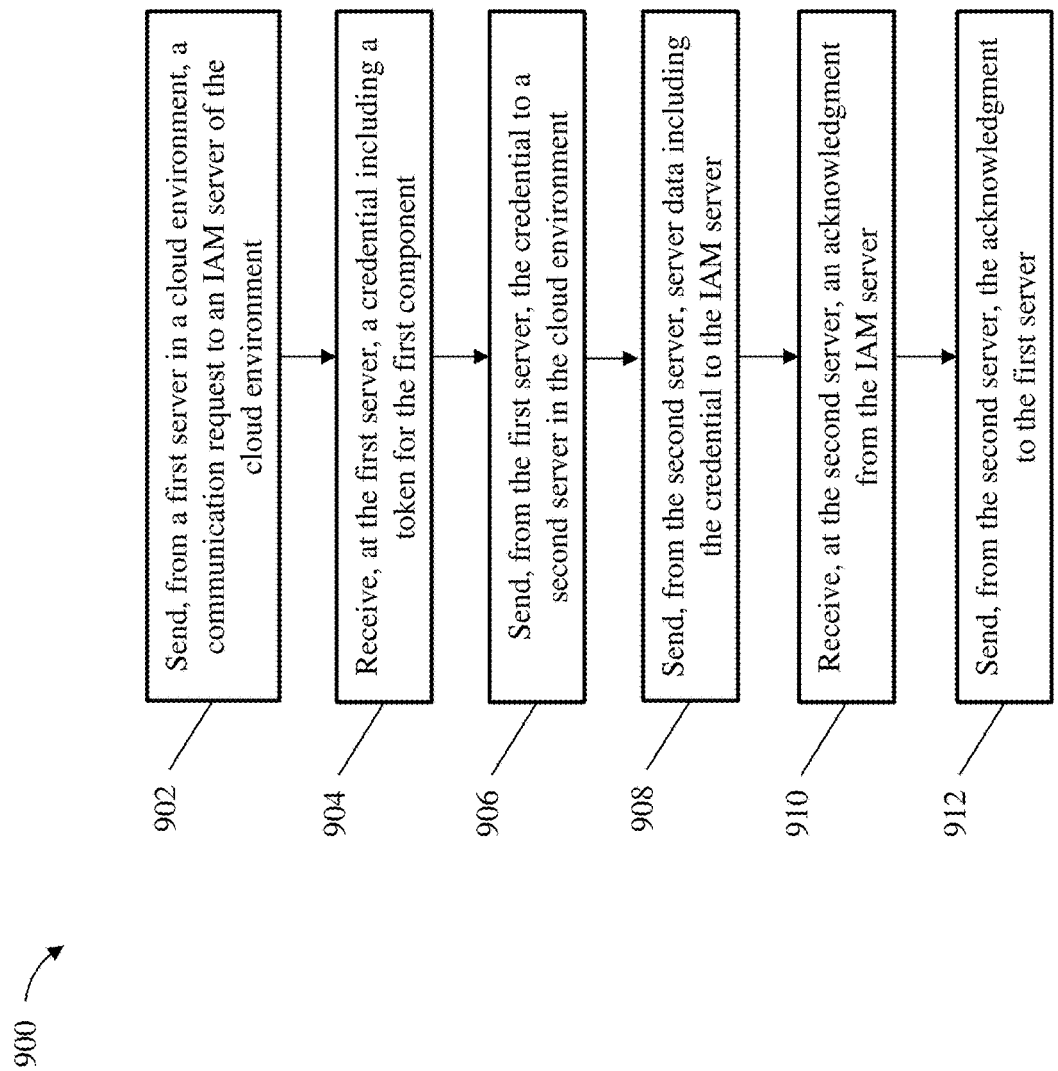
FIG. 9 is a flowchart in accordance with one or more embodiments of the present invention.

Referring now to FIG. 9, a flowchart 900 for preventing masquerading service attacks is generally shown according to an embodiment. The flowchart 900 is described in reference to FIGS. 1-6 and may include additional blocks not depicted in FIG. 9. Although depicted in a particular order, the blocks depicted in FIG. 9 can be rearranged, subdivided, and/or combined. At block 902, a first server in a cloud environment sends a communication request that includes an API key and a first server identifier to an IAM server of the cloud environment. In some embodiments of the invention, the API key is uniquely assigned by the IAM server to a first component of the first server. In some embodiments of the invention, the first server identifier includes identification data that is unique to the first server in the cloud environment.

At block 904, the first server receives a credential that includes a token for the first component. In some embodiments of the invention, the first component is stored within a lock-down system of the first server. In some embodiments of the invention, the lock-down system includes a limited API that does not include functionality for providing the API key to an SRE of the cloud environment.

At block 906, the first server sends the credential to a second server in the cloud environment. In some embodiments of the invention, the second server identifier includes identification data that is unique to the second server in the cloud environment.

At block 908, the second server sends server data that includes the credential, a second server identifier, and an identifier for a second component of the second server to the IAM server. In some embodiments of the invention, the server data further includes a service identifier associated with a service policy of the cloud environment.

At block 910, the second server receives an acknowledgment from the IAM server. At block 912, the second server sends the acknowledgment to the first server. Notably, the acknowledgments do not include the API key.

The method can further include initializing a communication channel between the first component and the second component after the first server receives the acknowledgement from the second server. In this manner the first component can access data from the second component that is otherwise restricted.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
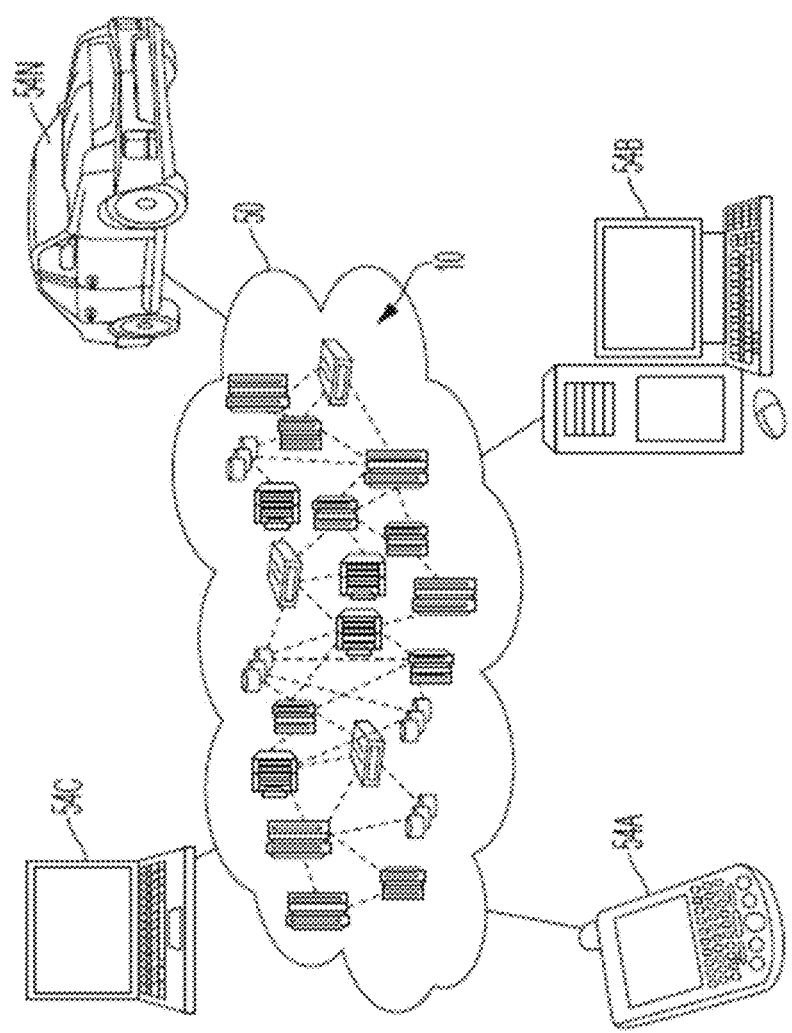
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
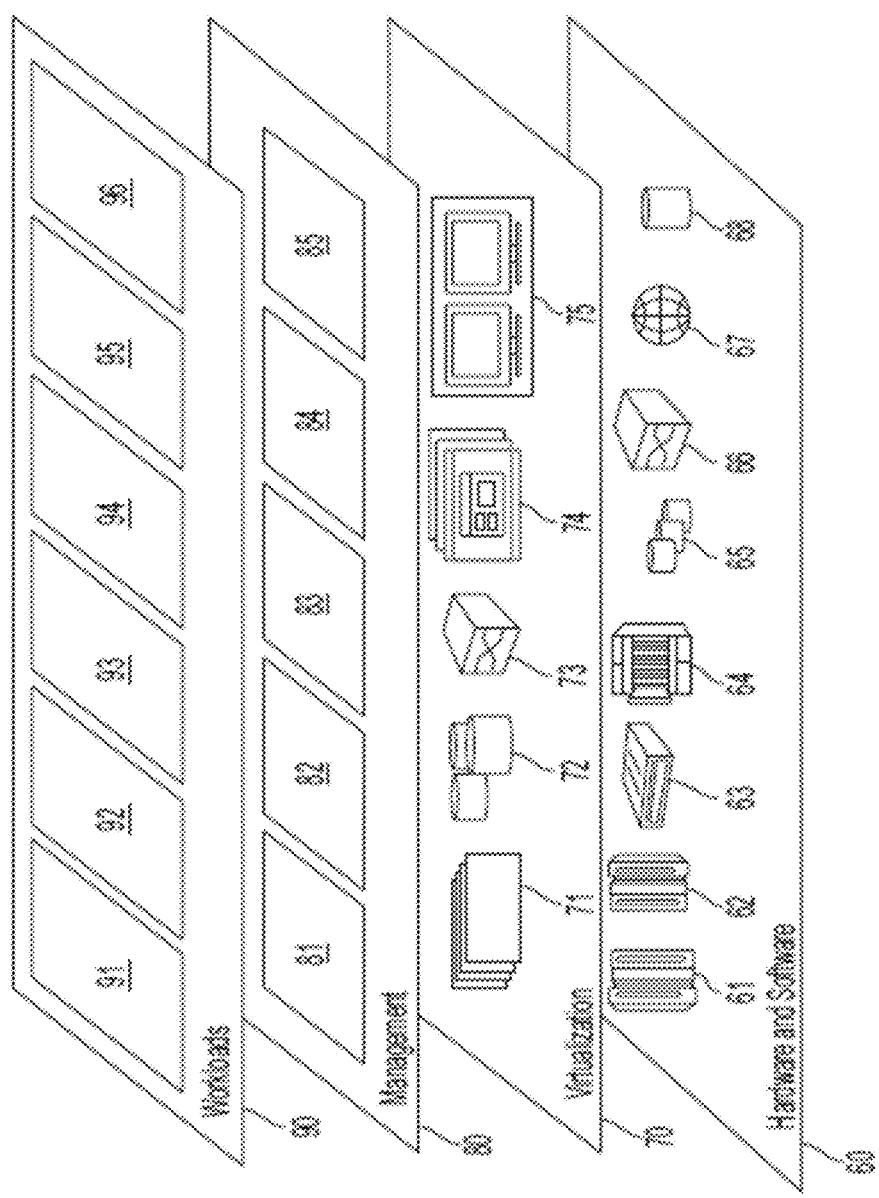
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 61; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 71, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 81 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 91; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, any or all of the blocks depicted with respect to FIGS. 7, 8, and 9, can be implemented as part of a computer-implemented method, a system, or as a computer program product. The system can include a memory having computer readable instructions and one or more processors for executing the computer readable instructions, the computer readable instructions controlling the one or more processors to perform operations including those depicted with respect to FIGS. 7, 8, and 9. The computer program product can include a computer readable storage medium having program instructions embodied therewith, the program instructions executable by one or more processors to cause the one or more processors to perform operations including those depicted with respect to FIGS. 7, 8, and 9.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving, at a server in a cloud environment, a cloud admin application programming interface (API) key and a service policy from a cloud administrator of the cloud environment;
sending, from the server, server data comprising the cloud admin API key, the service policy, and a server identifier to an identity and access management (IAM) server of the cloud environment;
receiving, at the server, a registration acknowledgment from the IAM server, wherein the registration acknowledgment indicates that the IAM server has added the server to an internally maintained list of trusted servers; and
sending, from the server, the registration acknowledgment to the cloud administrator.

2. The computer-implemented method of claim 1 further comprising signing, by the server, the server data using a public key of the server.

3. The computer-implemented method of claim 2, wherein the server signs the server data prior to sending the server data to the IAM server.

4. The computer-implemented method of claim 2, wherein the registration acknowledgment indicates that the IAM server has verified the public key against a private key internal to the IAM server.

5. The computer-implemented method of claim 1, wherein the server identifier comprises identification data that is unique to the server in the cloud environment.

6. A computer-implemented method comprising:
receiving, at a server in a cloud environment, a request for component deployment from an administrator of the cloud environment, wherein the request comprises an identifier for a component within the server;

sending, from the server, server data comprising the request for component deployment and a server identifier to an identity and access management (IAM) server of the cloud environment;

receiving, at the server, an acknowledgment from the IAM server comprising a component application programming interface (API) key; and sending, from the server, an acknowledgment to the administrator that does not include the API key.

7. The computer-implemented method of claim 6, wherein the administrator comprises a site reliability engineer (SRE) of the cloud environment.

8. The computer-implemented method of claim 6, wherein the server identifier comprises identification data that is unique to the server in the cloud environment.

9. The computer-implemented method of claim 6, wherein the acknowledgement from the IAM server indicates that the component has been deployed by the IAM server.

10. The computer-implemented method of claim 6 further comprising signing, by the server, the server data using a public key of the server.

11. The computer-implemented method of claim 10, wherein the server signs the server data prior to sending the server data to the IAM server.

12. A computer-implemented method comprising:

receiving, at a server in a cloud environment, a cloud admin application programming interface (API) key and a service policy from a cloud administrator of the cloud environment;

sending, from the server, server data comprising the cloud admin API key, the service policy, and a server identifier to an identity and access management (IAM) server of the cloud environment;

signing, by the server, the server data using a public key of the server;

receiving, at the server, a registration acknowledgment from the IAM server, wherein the registration acknowledgment indicates that the IAM server has verified the public key against a private key internal to the IAM server; and sending, from the server, the registration acknowledgment to the cloud administrator.

* * * * *